(12) United States Patent
Hinsberg

(10) Patent No.: US 6,246,461 B1
(45) Date of Patent: Jun. 12, 2001

(54) IMAGE POSITIONING DEVICE AND METHOD

(76) Inventor: Gregor Hinsberg, Jakob Kneip Strasse 7 51105, Köln (DE)

( * ) Notice: Subject to any disclaimer, the term of this patent is extended or adjusted under 35 U.S.C. 154(b) by 0 days.

(21) Appl. No.: 09/346,261

(22) Filed: Jul. 1, 1999

(51) Int. Cl.[7] ............................. G03B 25/00; G09F 19/00
(52) U.S. Cl. ............................. 352/98; 352/99; 40/530; 40/531; 40/534
(58) Field of Search ............................. 352/87, 98, 99; 40/526, 527, 530, 531, 534, 389; 434/257; 400/657

(56) References Cited

U.S. PATENT DOCUMENTS

| | | | | |
|---|---|---|---|---|
| 800,701 | * | 10/1905 | White | 40/530 |
| 864,984 | * | 9/1907 | McPhee | 400/657 |
| 930,290 | * | 8/1909 | Hohn | 40/530 |
| 1,466,252 | * | 8/1923 | Shaw | 352/99 |
| 1,787,592 | * | 1/1931 | Owens | 359/99 |
| 2,105,696 | * | 1/1938 | Lewis | 40/389 |
| 2,253,858 | * | 8/1941 | Lucas et al. | 40/531 |
| 2,595,972 | * | 5/1952 | Naurison | 352/99 |
| 3,593,432 | * | 7/1971 | Reynolds | 434/257 |
| 3,740,128 | * | 6/1973 | Adler | 352/99 |
| 4,227,326 | * | 10/1980 | Alder | 40/527 |
| 4,283,871 | | 8/1981 | Applebaum et al. | 40/768 |
| 4,441,270 | * | 4/1984 | Crowell et al. | 40/534 |

FOREIGN PATENT DOCUMENTS

| | | |
|---|---|---|
| 921 734 | 12/1954 | (DE) . |
| 1 522 271 | 1/1967 | (DE) . |
| 0 148 597 | 7/1985 | (EP) . |
| 0 306 093 | 8/1988 | (EP) . |
| 2 618 385 | 1/1989 | (FR) . |
| 93/14485 | 7/1993 | (WO) . |

* cited by examiner

*Primary Examiner*—Russell Adams
*Assistant Examiner*—Rodney Fuller
(74) *Attorney, Agent, or Firm*—Thomas Hooker, P.C.

(57) ABSTRACT

An image positioning device includes surface elements having front and back sides and images on the front and/or the back sides. An end of a first surface element and a front side of a second surface element are turnably coupled along a first axis of rotation and an end of the second surface element and a front side of a third surface element are turnably coupled along a second axis of rotation. The first and second rotational axes are approximately parallel with one another. Successive flipping of the surface elements animates the images.

17 Claims, 13 Drawing Sheets

IMAGE POSITIONING DEVICE AND METHOD

FIELD OF THE INVENTION

The invention relates generally to an image positioning device.

BACKGROUND OF THE INVENTION

With an image positioning device, the spatial aspect of images can be varied. In the following, the term "image" is to be understood as a flat presentation either transparent or opaque, being made, for instance, by photography or printing.

An image positioning device for example, can be used for the flipping through plates of books, photo albums and the like. Especially however, it is employed for moving picture animation. In the case of a moving picture animation, the observer undergoes the effects called up by a continually changing image, i.e., an animated picture. For this purpose, a plurality of images which are non-changing during a time period (motionless images) is used. Such images are exhibited to the observer in quick sequence. Images in sequence differentiate themselves respectively only infinitesimally from one another, but from the view point of an observer, the impression of fluid motion arises.

An image positioning device has been disclosed by WO 93144-85. This proposes to employ a plurality of strips superimposed on one another running over a pair of rollers. Each strip exhibits a rapid sequence of images, each being a still-image, but providing a sense of motion. Seen from the exposed surface, there arises the impression of a combined moving image, which composes itself from the aligned, visually superimposing, single moving images of the sequence of still-images of each strip. Among other things, the complicated manipulation and the considerable expense of the associated device are disadvantageous.

A less expensive image positioning device is, for example, a so-called "Thumb-movie". In this case there are several flat surface elements, for instance several paper pages, arranged one above the other and rotatably coupled at one end with each other. In each case, the front sides, and/or the rear sides of the paper plates carry images, that is, still-images for a moving image animation. The complicated circumstances of handling this arrangement is also a disadvantage.

DE-PS-9 21 734 discloses an expensive image positioning device, in which image carrying, zig-zag prefolded strips, with the help of a pulling roller, are unfolded and again refolded together.

DE-OS 15 22 271 brings into common knowledge an equally expensive image positioning device where the ends of a plurality of surface elements, each carrying an image and coupled on a carrier band, are run over a roller and a guide bar.

SUMMARY OF THE INVENTION

The present invention makes available a completely new image positioning device or animation device, which creates further advantages, among which it is easily manipulated and is of small expense.

This favorable state is arrived at by an image positioning device possessing surface elements wherein the front sides and/or the rear sides carry images and respectively one end of a first surface element and a front side of a second surface element are turnably coupled along a first rotational axis. Then, one end of the second surface element and one front side of a third surface element are turnably coupled along a second rotational axis. The said first and the second rotational axes are, essentially, parallel.

Further, one end of the third surface element and one front side of a fourth surface element are coupled along a third rotational axis, and so on.

The surface elements are advantageously relatively thin and essentially are comprised of two flat surfaces, which are parallel to one another, which form the front and back sides of the surface elements.

Each surface element has also two rotational axes: a first rotational axis on its lead end (which is turnably coupled to a previous surface element) and a second rotational axis on one of its ends (by which it is turnably coupled on the lead end of an immediately following surface element). Particularly advantageously, the combined rotational axes of the image positioning device are parallel.

In a start-position of the image positioning device, the front and rear sides of the respective coupled surface elements are at rest. All front sides are directed then, in a first direction, and all rear sides in a second, opposite direction. Particularly advantageously, the surface elements are coupled in such a manner, that in this start-position, all rotatably coupled ends lie on the respective same side of the surface element.

The image positioning device can then be advantageously operated in the following described manner:

In the start-position, for instance, the front sides preferably of the stacked surface elements face upward and the undersides downward. If a force acts horizontally upon the first element, that is, the surface element lying on top, then this first element rotates about the rotational axis at its end (by which end the lead end of the second surface element is coupled). This second surface element remains motionless. The rotational motion of the first surface element ends, when it has turned over, almost 180°. At this point, the front side of the first surface element faces downward, and the back side upward.

If the force continues, then the first surface element slides itself in a horizontal direction and transmits the force to the second surface element. This leads to a rotation of the second surface element about its axis of rotation at its end by which it is coupled to the front side of the next sequential surface element, and so on. The force acts in this way to effect a successive flipping of the surface elements.

During the first half of this inversion, the rear side of the last surface inverted respectively faces upward, as does the front side of the following about-to-be inverted surface element. During a second half of the inversion, the rear side of the now inverted surface element, and the front side of the immediately following surface element face upward.

To an observer, then, the images appear sequentially, one after the other, front and back sides. If the force works in the reverse direction, then the above procedure is likewise reversed. The last flipped surface element is tipped back, and then the subsequent surface element is reversed, etc.

The image positioning device has, in summary, the advantages of simple construction and simple manipulation.

Particularly advantageously, in the case of the image positioning device, the front sides and/or the rear sides show still-images to be combined for a moving animation. When the image positioning device is operating, an observer would be shown in alternating rapidity the front and back sides. The observer has, as was mentioned above, the impression of a continually self-changing moving image.

Where the image animation is concerned, by the reversal of the force acting on the surface elements, in a simple way, the animation direction is likewise reversed. Besides this, the flipping frequency and thus the animation tempo can be changed by the degree of force exerted.

Particularly advantageous is an embodiment, which is shown by respectively the front side and the rear side of coupled surface elements of an entirely still-image. As above described, upon the operation of the image positioning device in accordance with the invention, respectively, a rear side of a surface element and a front side of a thereupon following, coupled surface element, face upwards. This can also indicate at times, a part of a complete still-image.

Contrary to conventional moving images, it can be pointed out that for the same cost, the surface of the entire moving image is larger and for the same area of the entire moving image, the expense is less.

Particularly advantageously, the respective rotational axes of the surface elements are placed close to one another or adjacent to one another.

In the initial condition, the image positioning device takes up relatively little room. Moreover, by means of the positional displacement of the rotational axes, the tempo of the animation can also be altered. The closer the rotational axes are to each other, just so much faster is the tempo of the animation.

The rotational axes can, essentially, be located at a large spatial interval from one another. By variation in the spatial difference—with a constant force—the animation tempo can be varied in this additional manner.

In an advantageous embodiment, the surface elements can be of paper, cardboard, or plastic. This leads to a lower cost of manufacture and lightness in weight.

Advantageously, the image-positioning device of the invention is principally comprised, respectively, of the said paper, cardboard, or plastic, all folded in an accordion-like manner. Especially, the said device can be fashioned out of strips of paper, cardboard or plastic with generally parallel folds. By means of the folds, the said strips are subdivided into sections. Every two sequential sections are coupled to a section pair, for instance, by adhesive. Each section pair forms a functional surface element. The fold between every two sequential section pairs leads to the fact, that these—in a very simple way—are rotationally attached to one another. This leads again to low manufacturing costs.

It is particularly advantageous to manufacture the strips, so that one page, for instance, is made of paper, cardboard or plastic and that the pages are separated along parallel lines in such a way, that a meandering strip results and then the strips are folded in alternating manner as above.

The advantage is that standard page formats can be used, whereby the manufacturing costs are further diminished.

Other objects and features of the invention will become apparent as the description proceeds, especially when taken in conjunction with the accompanying drawings illustrating seven embodiments of the invention, of which there are 13 sheets.

DESCRIPTION OF THE PREFERRED EMBODIMENT

Figure 1:
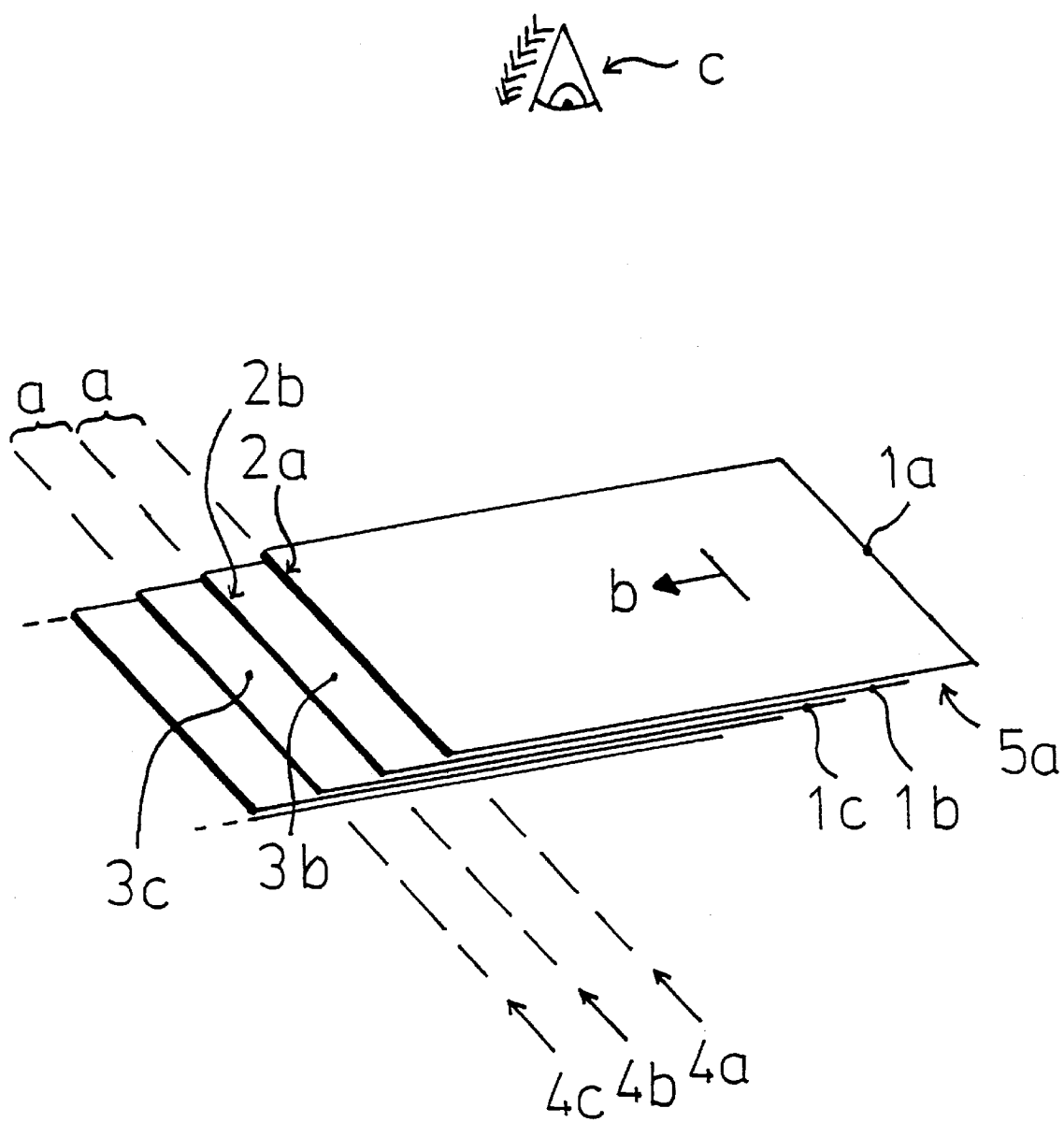
FIG. 1 is a perspective view of a first embodiment image positioning device constructed in accordance with the invention and shown in a start condition.

The image positioning device or animation device shown in FIG. 1 is comprised of a plurality of thin, rectangular plastic plates 1a, 1b and 1c. The plastic plates 1a, 1b and 1c are essentially all of the same size. An end or edge 2a of the first plastic plate 1a is coupled to front side 3b of the second plastic plate 1b along a first rotational axis 4a and an end or edge 2b of the second plastic plate 1b is coupled to a forward side 3c of the third plastic plate 1c along a second rotational axis 4b, and so on.

In the depicted start-condition of FIG. 1, the front sides 3b, 3c of the plastic plates 1a, 1b, and 1c face upwards, and the rotationally coupled ends 2a, 2b lie to the left. The rotational axes 4a, 4b and a rotational axis 4c at the end of the plastic plate 1c are parallel. The respective two rotational axes 4a, 4b; 4b, 4c of each plastic plate 1b; 1c, lie nearly next to one another, in each case at the same distance a.

The rotational coupling between the two plastic plates 1a, 1b; 1b, 1c is accomplished by means of a turnable linkage or hinge (not shown here) wherein one plastic plate 1a, 1b, for instance carries a bolt and the other plastic plate 1b, 1c, for instance, carries a hinge bushing of the rotatable linkage.

The front sides 3b, 3c and the back sides 5a of the plastic plates 1a, 1b, 1c exhibit images thereon (not shown here). These can be images, for example, relating to animation, whereby respectively the front side 3b of one of the plastic plates 1b and the back side 5a of the previous plastic plate 1a, carry corresponding, associated parts of a composite still-image.

Figure 2:
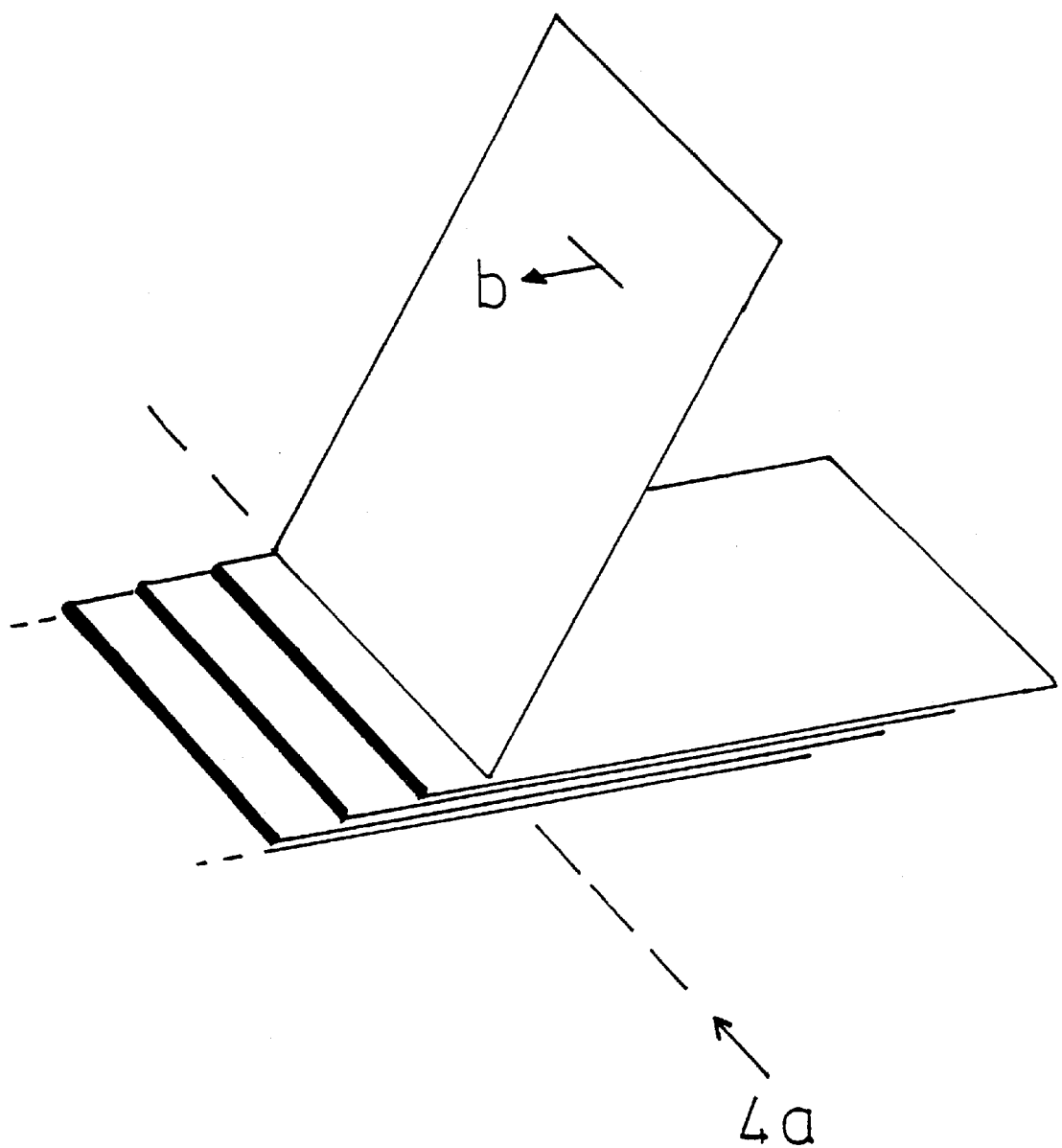
FIG. 2 is a perspective view illustrating initial operation of the device of FIG. 1.
Figure 3:
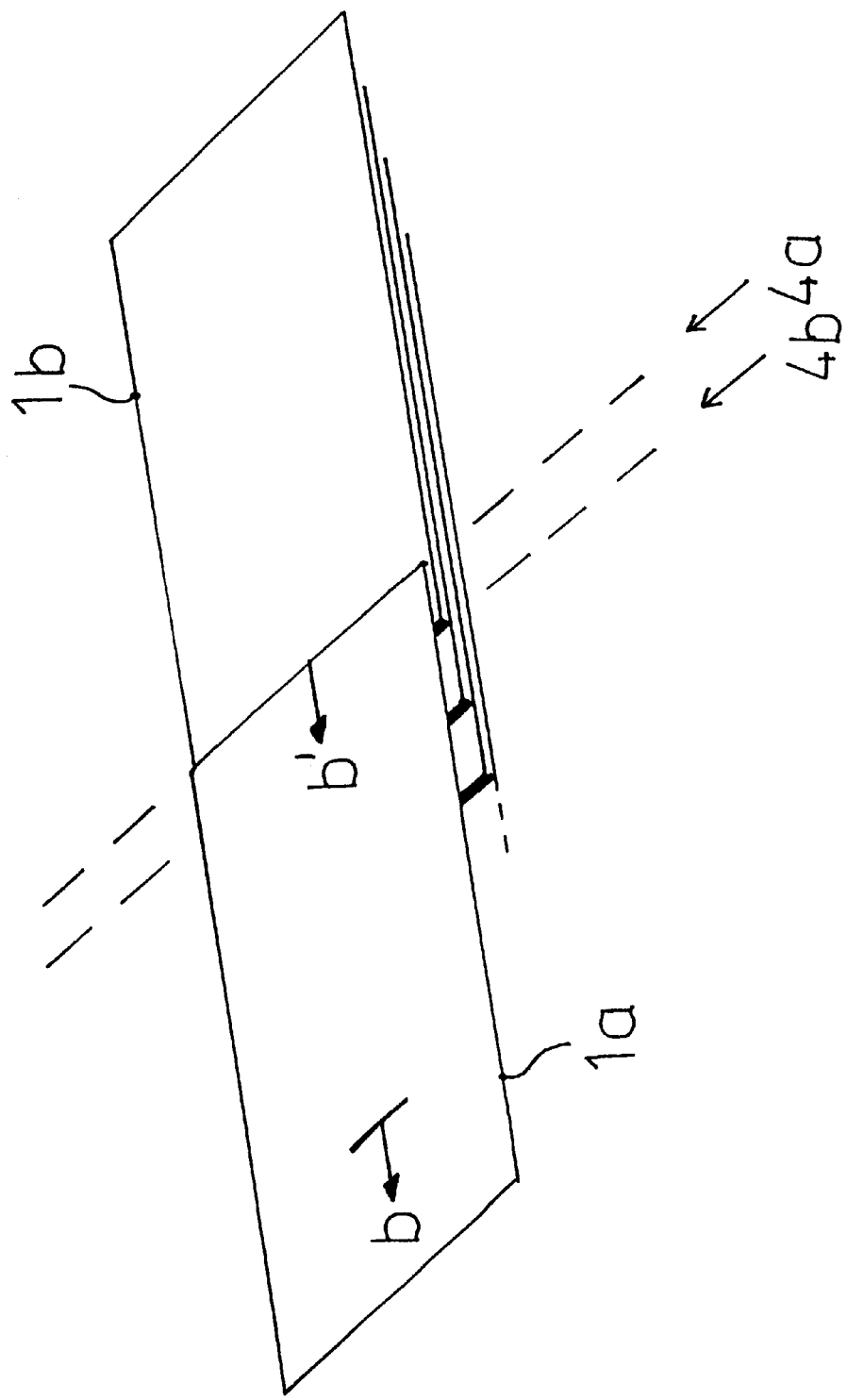
FIG. 3 is a perspective view illustrating further operation of the device of FIG. 1.

If, in accord with FIG. 1, a pulling force is exerted in a horizontal direction and perpendicular to the rotational axes 4a, 4b, and 4c on the first plastic plate, then as shown in FIG. 2, this plate is turned about the rotational axis 4a, until it reaches the position shown in FIG. 3, that is, the plate has been rotated through 180°.

The pulling force b then extends its action to slide the first plastic plate 1a in the shown direction of the force and the pulling force is then transferred to the second plastic plate 1b (force b'). This plate starts to turn itself around the rotational axis 4b and so on. The plastic plates 1a, 1b, and 1c are also turned 180°, one after the other.

Now, facing upward, are the back side 5a of one of the plastic plates 1a and the front side 3b of the sequentially next plastic plate 1b. This means that sequentially respective, associated parts of an entire still-image face upward. If these, in the manner of FIG. 1 are observed by a beholder or observer "c" from above, the said observer will have the impression of a constantly moving and changing image.

If the direction of the pulling force is reversed (not shown), then the above described procedure runs in the opposite sequence: one after the other, the plastic plates 1b, 1c are turned back around one of the axes of rotation 4b, 4c, until the start position depicted in FIG. 3 is attained. Finally, the first plastic plate 1a turns itself back around the rotational axis 4a in accord with the FIGS. 3, 2, 1 to reach the start position. The animation will run backwards.

Figure 4:
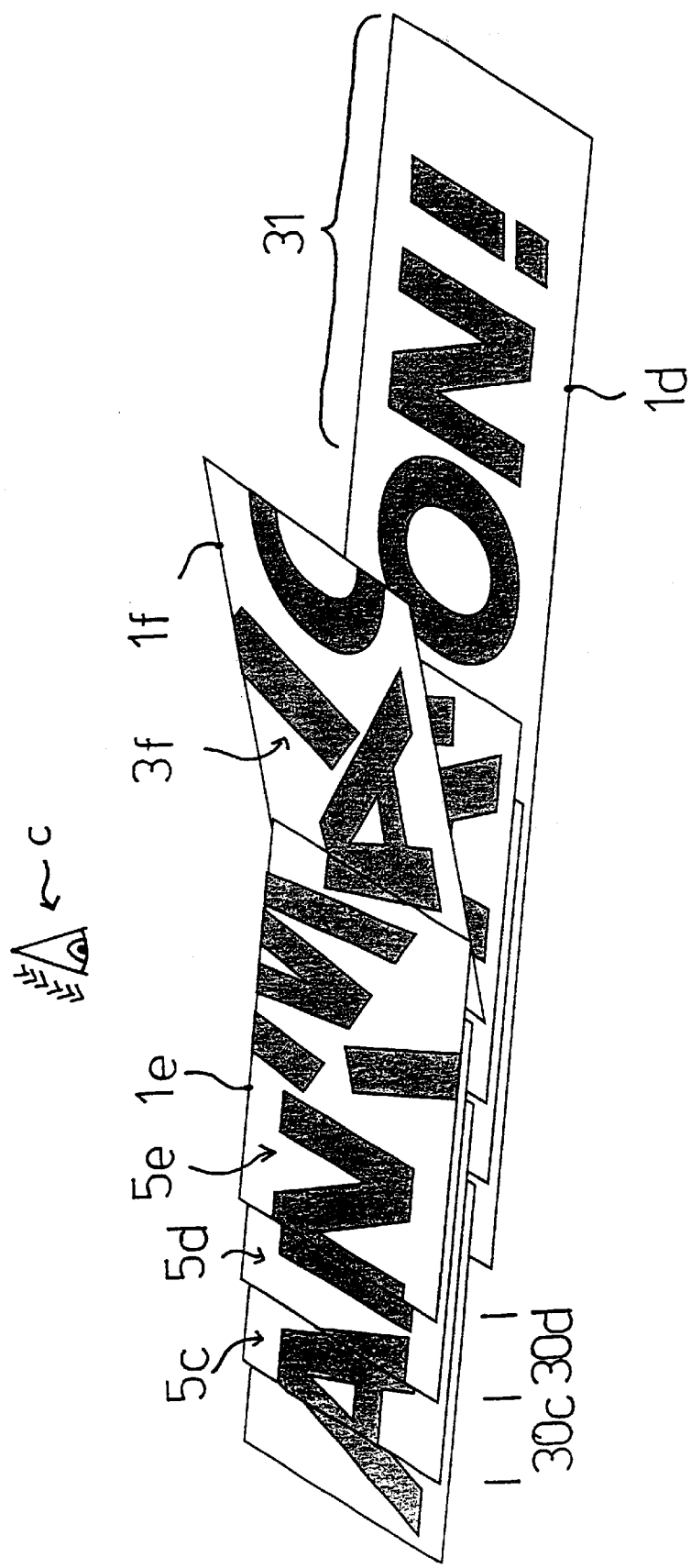
FIG. 4 is a perspective view of the device of FIG. 1 illustrating a final plastic plate of the assembly.

FIG. 4 shows the device of the FIGS. 1 to 3 with additionally a final plastic plate 1d, which possesses a greater extension in the horizontal direction than the other plastic plates 1e and 1f possess.

The observer "c" sees from above, respectively, the back side 5e of the plastic plate 1c, a front side 3f of the thereupon following plastic plate 1f, the non-covered section 30c, d, of the upward facing back side 5c, d, as well as a non-covered section 31 of the final plastic plate 1d.

Figure 5:
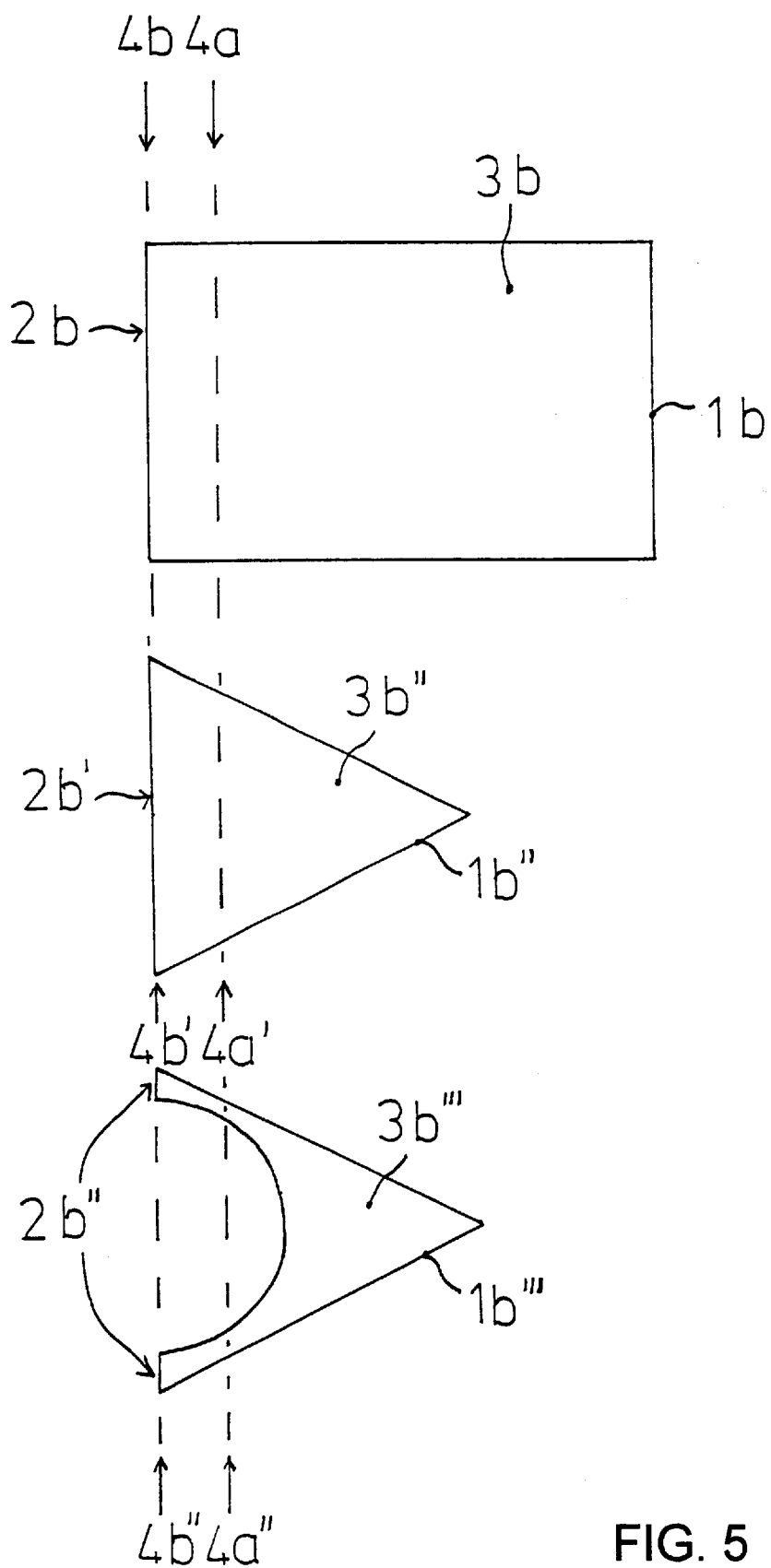
FIG. 5 is a top view illustrating a plastic plate of the assembly shown in FIG. 1 and plastic plates of a second embodiment and a third embodiment image positioning device constructed in accordance with this invention.

FIG. 5 shows the plastic plate 1b. Besides this, as a second embodiment is shown a plastic plate 1", triangular in shape, and as a third embodiment, is demonstrated another triangular plastic plate 1b'" this time with a semicircular cutout. The end 2a of the plastic plate 1a shown in FIGS. 1–4 (not shown in FIG. 5) is coupled along the rotational axis 4a to the front side 3b of the plastic plate 1b. Along the rotational axis 4b is the end 2b of the plastic plate 1b shown in FIGS. 1–4 (not shown in FIG. 5), coupled to the front side 3c of the plastic plate 1c. In the same manner, ends of the previous plastic plates (not shown) are coupled onto the front sides 3b", 3b'" of the plastic plates 1b", 1b'" along the rotational axes 4a', 4a". Along the rotational axes 4b'. 4b" are ends 2b', 2b" of the plastic plates 1b", 1b'" coupled to the front sides of the sequentially following plastic plates (not shown).

Figure 6:
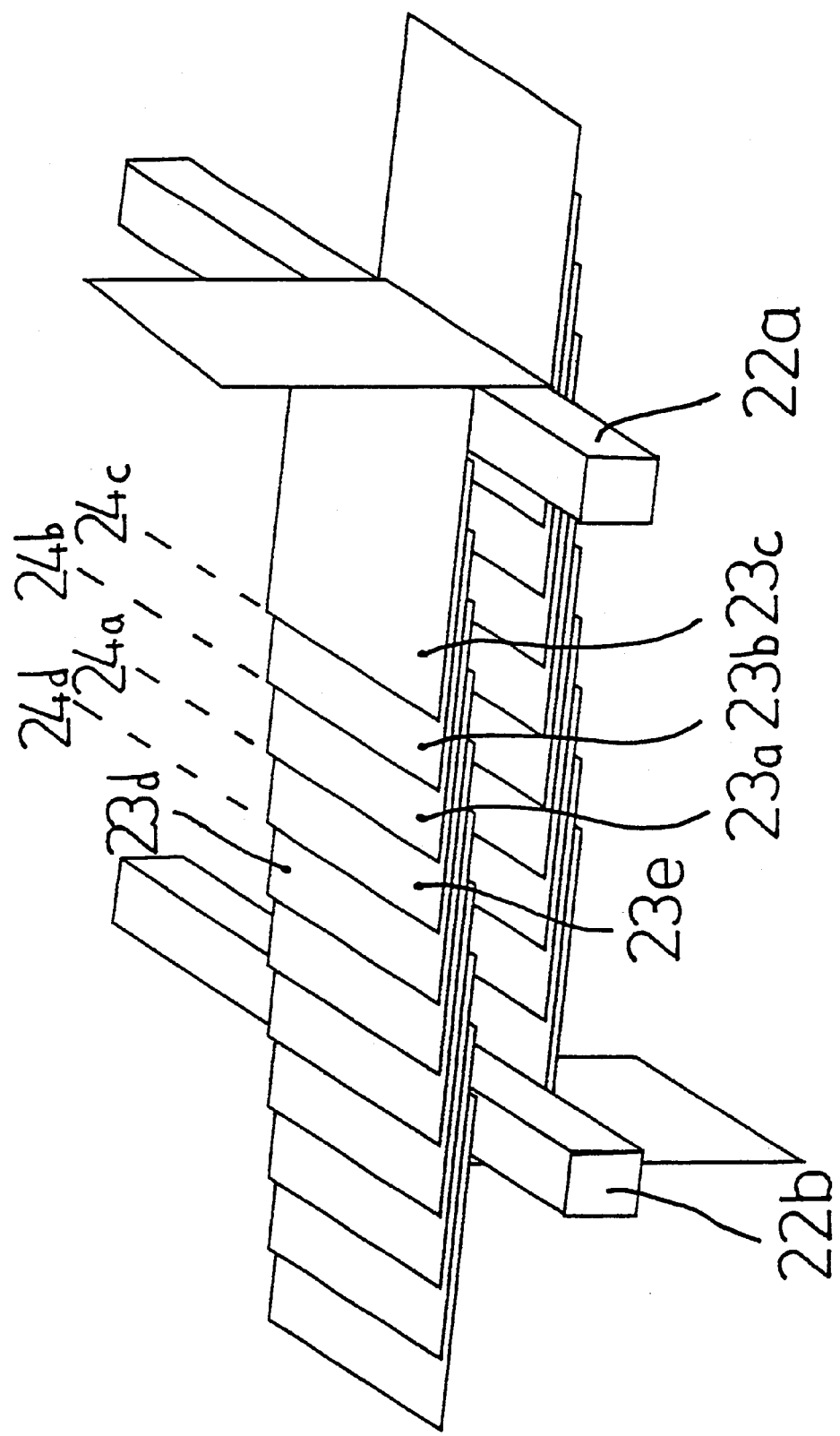
FIG. 6 is a perspective view of a fourth embodiment image positioning device constructed in accordance with this invention.

In the case of the image positioning device or animation device of FIG. 6, are rectangular plates 23a, 23b, 23c, 23d, and 23e—here preferably of plastic or metal—corresponding to the embodiment of FIGS. 1–4 coupled along parallel rotational axes 24b, 24c and 24d. A first plate 23a is coupled with a second plate 23b, the second plate 23b is coupled with a third plate 23c, and so on. A plate next to the last 23d is coupled with the last plate 23e. The plates 23a, 23b, 23c, 23d, 23e exhibit images which are not shown here. The band which arises from the couplings, is led over a rectangular cross-section first bar 22b lying in the direction of the rotational axes 24b, 24c and 24d, so that said band undergoes a directional change of 180°, and returns over a like rectangular cross sectioned, second bar 22a which bar lies in the direction of the rotational axes 24b, 24c and 24d wherein the said band experiences another 180° turn. The first plate 23a is coupled along rotational axis 24a with the last plate 23e in accord with FIGS. 1–4 along rotational axis 24a, so that an endless band is created, running over the bars 22a, 22b. By means of turning the said bars, 22a, 22b, the plates 23a, 23b 23c, 23d, 23e can be turned 180°, one after the other.

Figure 7:
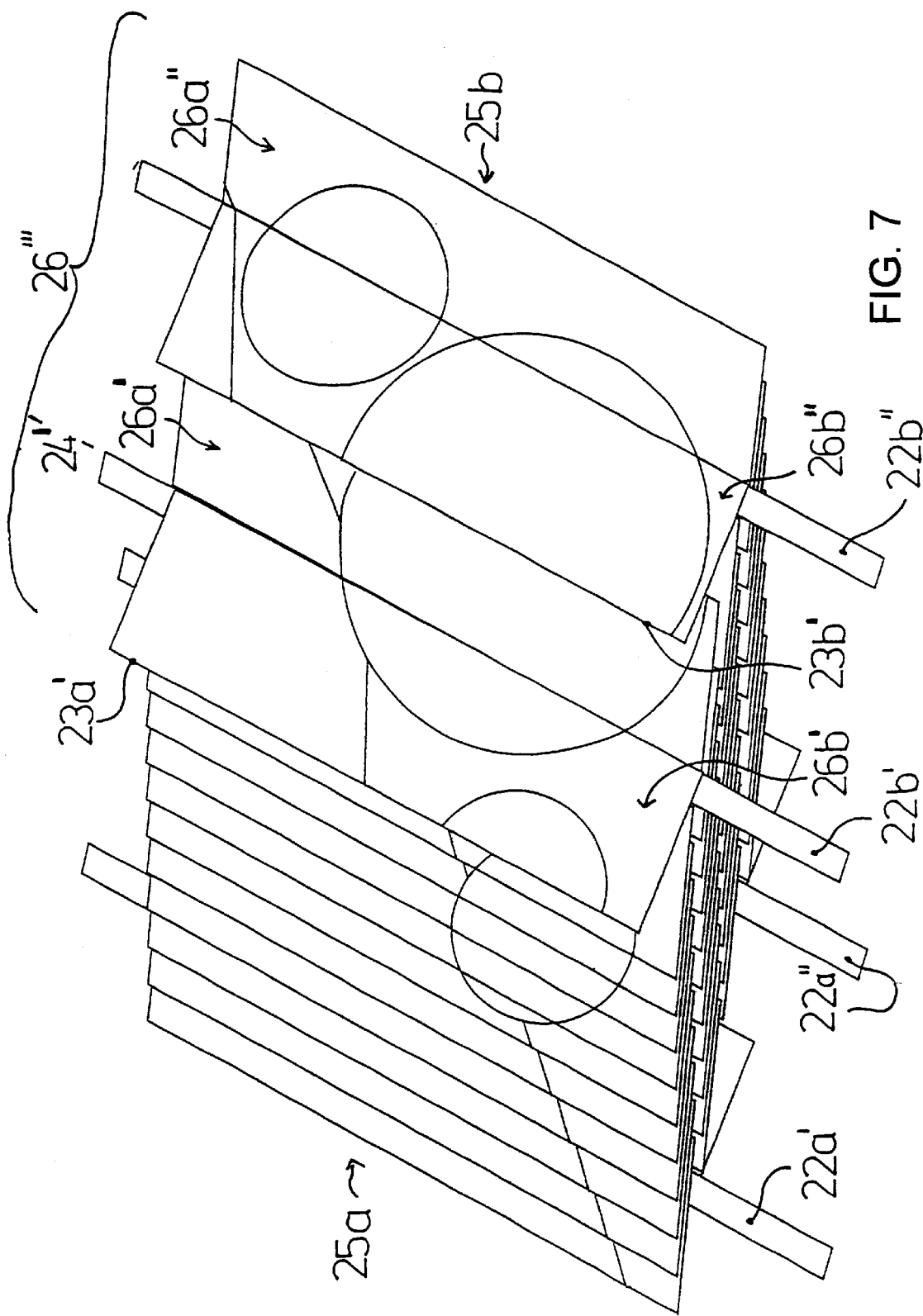
FIG. 7 is a perspective view of a fifth embodiment image positioning device constructed in accordance with this invention.

In the case of the image positioning device or animation device in accord with FIG. 7, rectangular plates 23a', preferably made of plastic or metal, are coupled in accord with the embodiments of FIGS. 1–4 and FIG. 6 along the parallel rotational axes 24', thus forming again an endless band 25a.

This band 25a is led over a bar 22a' (to the left as shown in FIG. 7) and over a bar 22b' (to the right as shown in FIG. 7). Correspondingly, rectangular plates 23b' are coupled into a second endless band 25b and led over a bar 22a" (to the left) and over a bar 22b" (to the right). The endless bands 25a, 25b are arranged one over the other. The left lying bars 22a', 22a" and the right disposed bars 22b', 22b" are respectively placed at a distance "v" from each other. The front and back sides of the plates 23a' of the first endless band 25a and the plates 23b' of the second endless band 25b carry (single) still images 26a', 26b' and 26a", 26b". Because of the offset of the bars 22a', 22a" or 22b', 22b", there becomes visible a combined still-image comprised of the single still-image of the first and the second endless bands 25a, 25b. Sequentially following one another (combined) still-images 26'" produce a combined image movement of an image animation.

Figure 8:
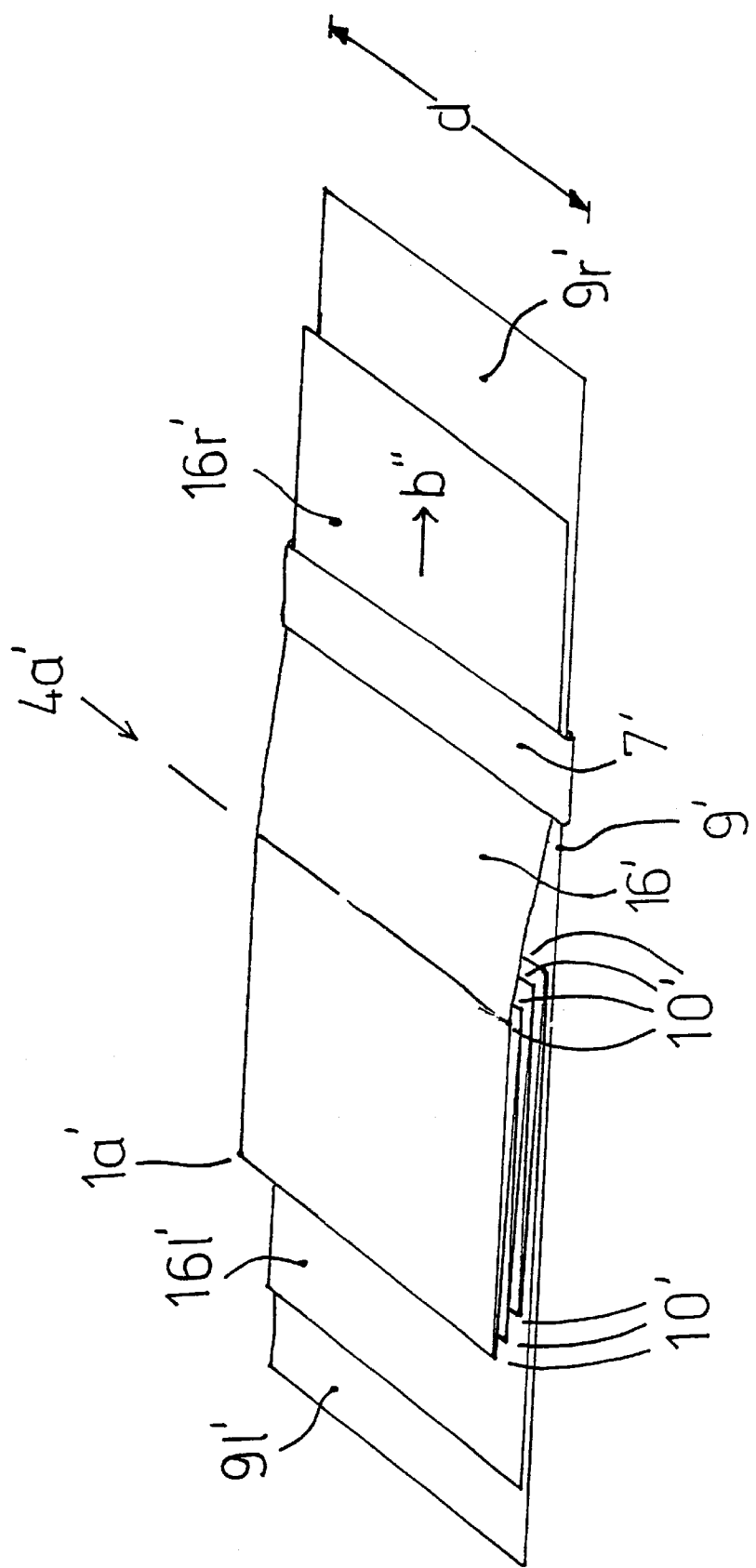
FIG. 8 is a perspective view of a sixth embodiment image positioning device constructed in accordance with this invention.

The image positioning device or animation device shown in FIG. 8 is comprised of paper strips 16" of constant width d, a guide sheet 9' and an encompassing guide ring 7', the latter being likewise of effective width d and made of paper. A left paper strip end 16l' is located on a left guide sheet end 9l and is coupled with this, for example, by means of adhesive.

The guide ring 7' encircles a right paper strip end and a right guide sheet end 9r'. The right paper strip end 16r' is thus slidingly extendable in direction b", relative to guide sheet 9'. The paper strip 16' is folded in an accordion-like fashion, with parallel lying folds 10'.

Figure 9:
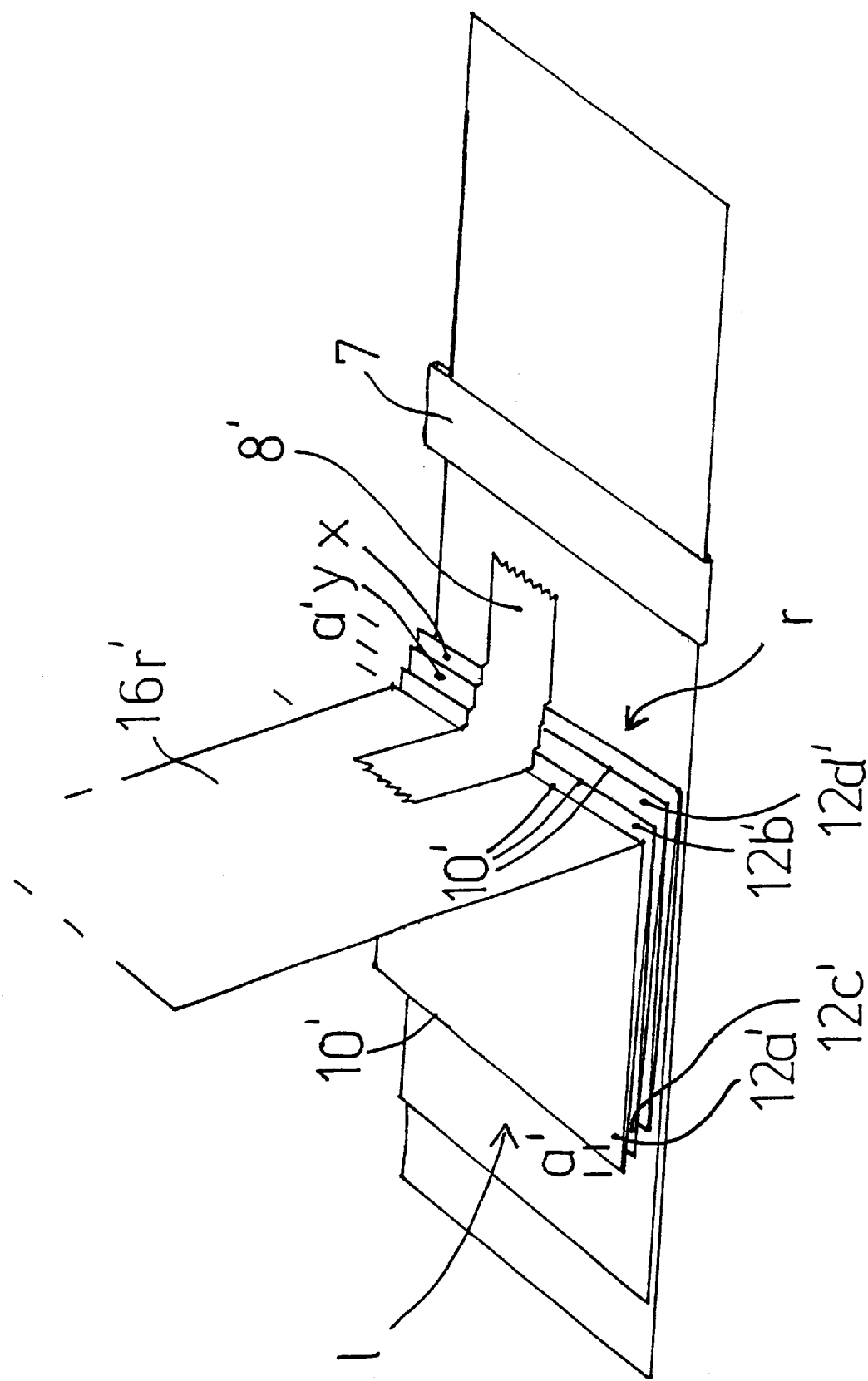
FIG. 9 is a perspective view illustrating withdrawal of a paper strip end from a guide ring of the image positioning device of FIG. 8.

In FIG. 9 the right paper strip end 16r' is withdrawn from the guide ring 7' and is shown rotated to the left. The folds 10' subdivide the paper strip 16' into sections on image sections 12a', 12b', 12c', 12d'.

On a right side r are shown respectively two sections 12b' and 12d', which are coupled pair-wise. Even so, also on left side 1, respectively two sections 12a', 12c' are coupled pairwise. On the right side r, in a longitudinal extension, is respectively an end area x of one of the coupled pair of sections 12b', 12c', protruding about a distance a' beyond the coupled pair of sections just above. In the same manner, on the left side, extends an end area of one of the coupled pairs of sections 12a', 12b', likewise by a distance a' beyond the pair lying thereunder, i.e. sections 12c' and 12d'.

On the right side r, an adhesive band or tape 8' fastens together each end area x and an end area y pairwise. Each coupled pair of sections 12a', 12b', 12c', 12d' located pairwise on the left side 1 beyond the folds 10' form, in accord with FIG. 10, functionally a surface element 1a', 1b', with respectively the sections 12a' 12c' as a front side 3a', 3c' and the sections 12b', 12d' as a back side 3b', 3d'. The pair of sections 12a', 12b'and 12c', 12d' can be coupled, i.e. by adhesives (not shown here).

Figure 11:
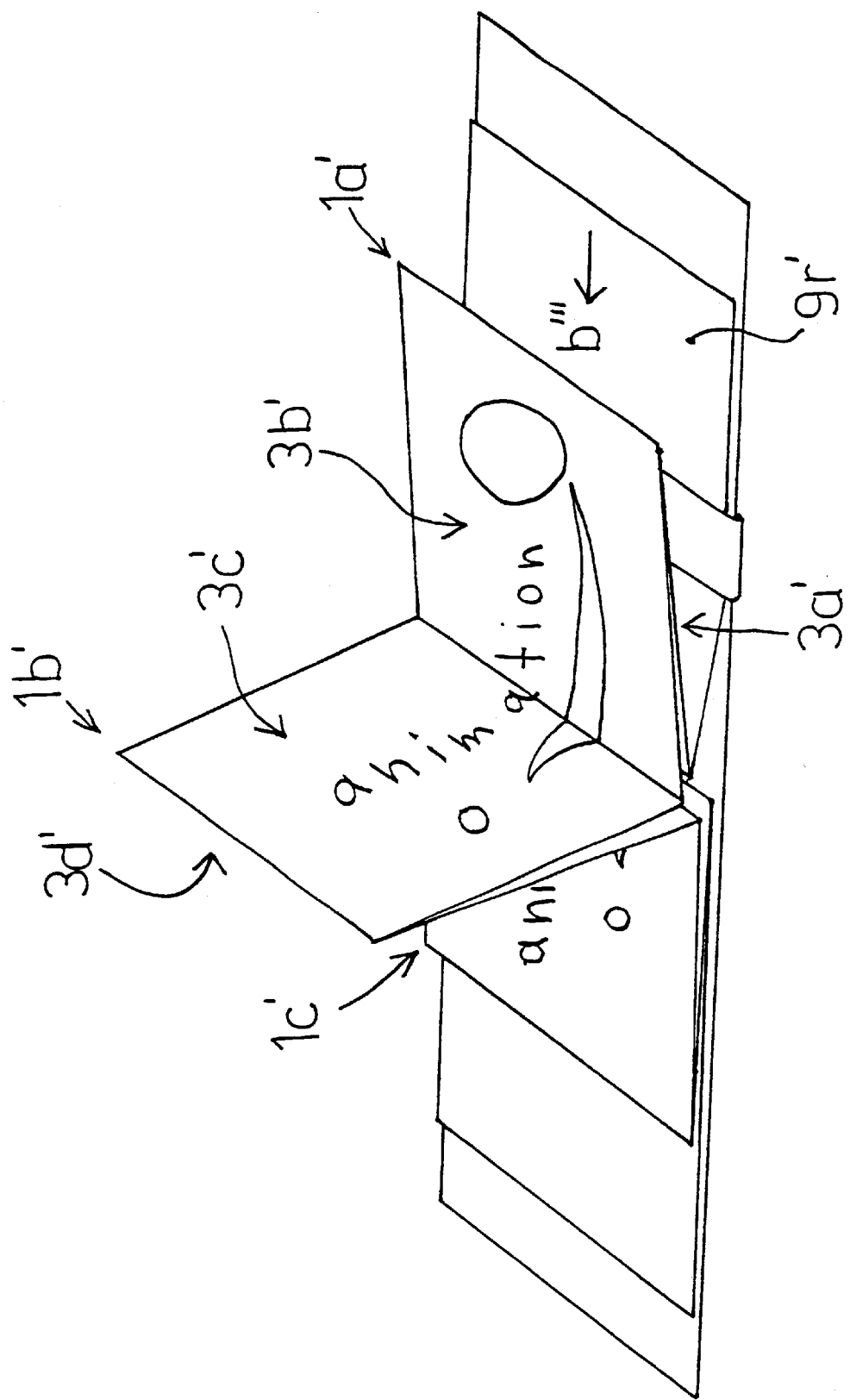
FIG. 11 is a perspective view illustrating reverse operation of the image positioning device of FIG. 8.

Each of the surface elements 1a' 1b' carry images for image animation on the front sides 3a', 3c' and on the back sides 3b' 3d', in accord with FIG. 11. At the same time, the front sides 3c' and back side 3b' carry parts which belong together of a composite still-image for an animation.

Figure 10:
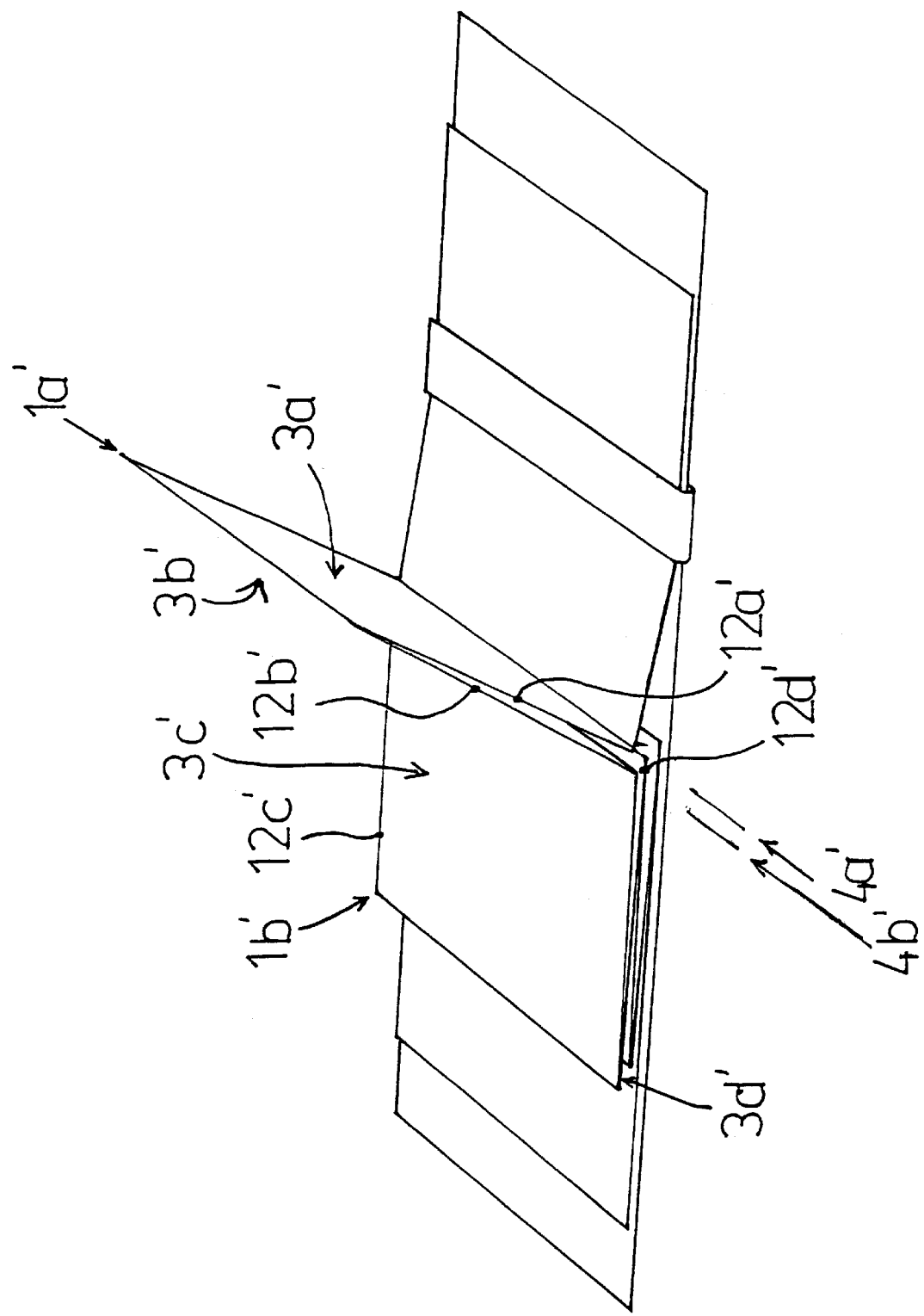
FIG. 10 is a perspective view illustrating operation of the image positioning device of FIG. 8.

If one moves the paper strip end 16' in accord with FIG. 8 in direction b", then the surface element 1a' rotates about the rotation axis 4a', until this reaches the FIG. 10 position. Then additionally, the surface element 1b' rotates about the axis of rotation 4b'. The surface element 1a' turns itself further, until it is in the position shown in FIG. 11. In this position, relative to FIG. 8, it has turned about 180°.

In this way, one after another, are exposed upward respectively, the back side 3b', 3d', of one of the surface elements 1a', 1b', 1c' and the front side 3a', 3c' of the next surface elements 1a', 1b', 1c' and then the back side thereof 3b', 3d' and the front side 3a', 3c' of the next-but-one surface elements 1a', 1b', 1c'. This means, that, one after the other, mutually belonging parts of a combined still-image will face upward. If this is observed from above, the impression arises of a continually changing composite moving image.

If one moves the paper strip end 9r' in accord with FIG. 11 in the reverse direction b''', then the above described procedure is run backwards. The image positioning device run through, one after the other, the positions shown in FIGS. 11, 10, 8, and the animation is reversed.

Figure 12:
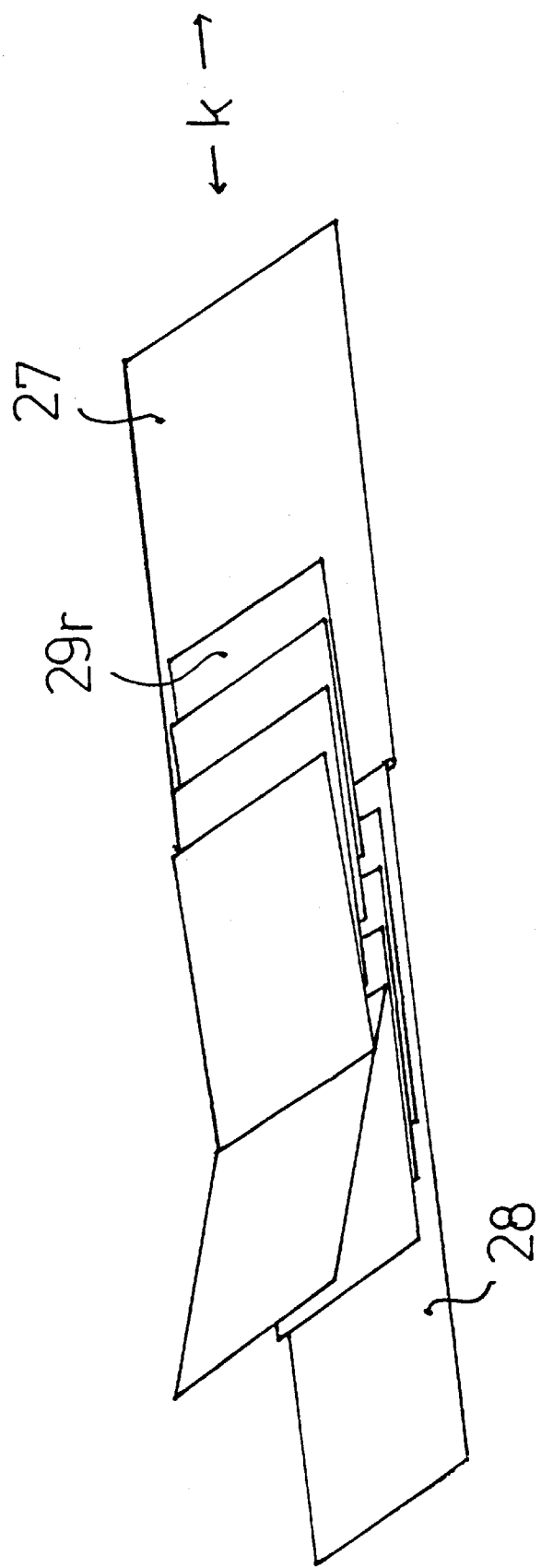
FIG. 12 is a perspective view of a seventh embodiment image positioning device constructed in accordance with this invention.

The depicted image positioning device or animation device shown in FIG. 12, corresponds, essentially, to that of FIGS. 8 to 11. The function of the guide ring 7' was taken over from an envelope, that is, in this embodiment the guide ring is formed as an envelope 27. The envelope 27 encompasses a guide strip 28. The guide strip is inserted into the envelope as sown in FIG. 12. This guide strip 28 is slidable in relation to the envelope 27 in the direction k. A right paper strip end 29r is coupled with the envelope, i.e. affixed thereto with adhesive.

Figure 13:
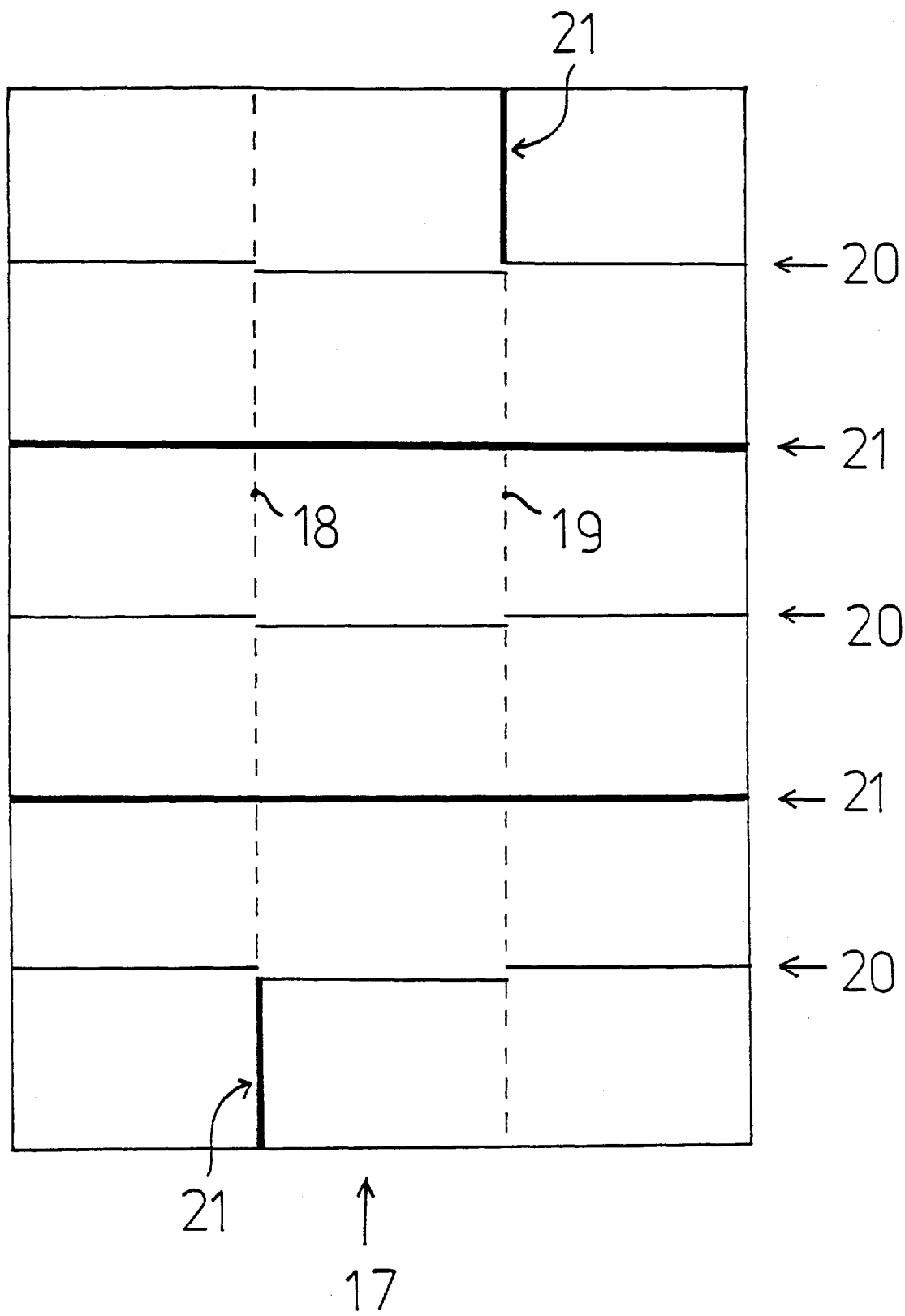
FIG. 13 is a top view of a plate or sheet of paper illustrating a method of manufacturing paper strips for use in the image positioning device shown in FIG. 8 or FIG. 12.

The paper strips 16' in accord with FIGS. 8–12 can be made in a very simple way from the page paper 17 shown in FIG. 13. This is printed with pictures (not shown) for a motion image animation.

In a first step the page paper 17 would be separated along the dotted lines 18, 19, so that a meandering strip is formed. In a second step, the meandering shaped strips would be folded along the thin lines 20 to the front, and along the thick lines 21 to the back. The paper strips 16' arising from this operation would be, in a third step, united with the guide strip 9' or 28, the guide ring 7' or envelope 27, and the adhesive band 8' to form the image positioning devices shown in FIGS. 8–12.

The invention now makes available a mechanical image positioning device or animation device, simple in construction and easy to manipulate, which can be economically manufactured.

While I have illustrated and described a preferred embodiment of the invention, it is understood that these embodiments are capable of modification, and I therefore do not wish to be limited to the precise details set forth, but desire to avail myself of such changes and alterations as fall within the purview of the following claims.

What I claim as my invention is:

1. An animation device for displaying a successive series of composite images to effect an animation, each composite image formed from a pair of side by side images that are associated parts of the composite image, the animation device comprising:
    a plurality of pairs of sheets arranged in a stack, said sheets formed from a continuous length of accordion-folded material comprising a plurality of first fold lines and a plurality of second fold lines;
    each pair of sheets overlying a respective lower pair of sheets, each sheet having an upper side, a lower side, and laterally opposed first and second edges, the first edges of the sheets being located on one side of the stack and the second edges of the sheets being located on the other side of the stack;
    each pair of sheets including an upper sheet overlying a lower sheet, a first image on the lower side of the upper sheet and a second image on the upper side of the lower sheet, the first and second images being associated parts of a composite image;
    said first fold lines joining upper and lower sheets of respective pairs of sheets, each of said first fold lines connecting the first edge of the upper sheet to the first edge of the lower sheet of the respective pair of sheets;
    said second fold lines joining each pair of sheets to a respective lower pair of sheets, each of said second fold lines joining the second edge of the lower sheet of a pair of sheets to the second edge of the upper sheet of a respective lower pair of sheets;
    the sheets in each pair of sheets being relatively rotatable about its respective first fold line from a folded position on the stack wherein the first and second images are between the pairs of sheets and face each other to an unfolded position wherein the upper sheet of such pair of sheets has rotated about the first fold line from the folded position and is located to one side of the lower sheet and both images face upwardly for display of the composite image; and
    an elongate flexible member joining the pairs of sheets to apply an unfolding force urging the sheets to rotate about their respective first fold lines, the flexible member comprising a plurality of sections each joining a pair of sheets to a respective lower pair of sheets, each section having opposed ends, one end attached to an upper sheet a distance away from the first edge of such upper sheet and the other end attached to an upper sheet of a respective lower pair of sheets a distance away from the first edge of such upper sheet;
    whereby rotating the uppermost sheet of the plurality of pairs of sheets to the unfolded position and moving the unfolded uppermost sheet laterally away from the stack of folded pairs of sheets causes each pair of sheets to unfold sequentially and display composite images of an animation sequentially.

2. The animation device of claim 1 wherein the pairs of sheets are stacked in a staggered formation with each lower pair of sheets protruding a distance from the first edges of the respective upper pair of sheets.

3. The animation device of 2 wherein the upper sheet of each lower pair of sheets includes a portion that protrudes from the respective upper pair of sheets; and
    the flexible member comprises an adhesive tape, the sections of the adhesive tape attached to and extending over the protruding portions of such upper sheets.

4. The animation device of claim 1 wherein the material comprises one of paper, cardboard and plastic.

5. The animation device of claim 1 further comprising a guide sheet for supporting the folded and unfolded pairs of sheets;
    the guide sheet having an elongate upper surface located beneath the folded pairs of sheets and extending laterally beneath the unfolded positions of the pairs of sheets; and
    the lower sheet of the bottom pair of sheets engaging the upper surface of the guide sheet and joined to the guide sheet.

6. The animation device of claim 5 further comprising a guide member surrounding a portion of the guide sheet beneath the unfolded positions of the pairs of sheets, the guide member engageable with the upper sheet of the uppermost pair of sheets when such upper sheet is in the unfolded position to guide lateral motion of such sheet along the guide sheet and away from the stack.

7. The animation device of claim 6 wherein such upper sheet is in its unfolded position and is fixedly attached to the guide member.

8. A device for displaying an animation generated from the successive display of a series of composite images, the device comprising:

an envelope having a top, a bottom, and an open end;

a guide strip slideably mounted in the envelope between the top and bottom of the envelope and having a portion protruding from the open end of the envelope;

a plurality of strip elements formed from a continuous length of accordion-folded material comprising a plurality of first fold lines and a plurality of second fold lines;

said plurality of strip elements arranged in a stack, the stack of strip elements including an uppermost strip element and a lowermost strip element, the strip elements mounted upon the protruding portion of the guide strip, the lowermost strip element joined to the guide strip portion for movement with the guide strip;

each strip element on the stack overlying a respective underlying strip element and having opposed front and back surfaces, a first edge adjacent the envelope and a second edge opposite the first edge, a first image exhibited on the front surface of the strip element and a second image exhibited on the back surface of the strip element, such second image facing the first image of the next underlying strip element and such second image and the first image of the next underlying strip element being configured to form a part of a composite image;

said first fold lines joining the strip elements to the respective underlying strip elements, each first fold line connecting the first edge of a strip element with the first edge of the next underlying strip element;

each strip element being relatively rotatable about a first fold line from a stacked position on the stack wherein the second image overlies and faces the first image of the next underlying strip element to a flipped position wherein the strip element has rotated about the first fold line from the stacked position and is located to one side of the respective underlying strip element and the second image and the first image of the respective underlying strip image face upwardly for display of the composite image;

an elongate flexible member joining the strip elements to urge the strip elements to rotate about their respective first fold lines, the flexible member comprising a plurality of sections each joining a strip element to a respective lower strip element, each section having one end attached to the upper surface of the strip element away from the edge of such strip element and the other end attached to the upper surface of the respective lower strip element away from the edge of such strip element;

the uppermost strip element being in the flipped position and fixedly attached to the top of the envelope;

whereby withdrawal of the guide strip from the envelope causes each of the stacked strip elements to rotate sequentially to the flipped position and display composite images of an animation sequentially.

9. The animation device of claim 8 wherein each underlying strip element comprises an upper sheet and a lower sheet, the upper sheet overlying the lower sheet when the strip element is in the stacked position, the first image of such strip element on the upper sheet and the second image of such strip element on the lower sheet; and the upper and lower sheets of such strip element each have opposed first and second edges, the first edge of the lower sheet forming the first edge of such strip element and the second edges of such upper and lower sheets joined to each other at the second edge of such strip element.

10. The animation device of claim 9 wherein the second fold lines join the second edges of the underlying pairs of sheets.

11. The animation device of claim 9 wherein the strip elements are arranged in a staggered relationship when in the stacked position, the first edge of an underlying strip element protruding a distance beyond the first edge of the respective overlying strip element.

12. The animation device of claim 11 wherein each lower sheet includes a portion that protrudes beyond the first edge of the respective overlying strip element; and the flexible member comprises an adhesive tape connected to and extending over the protruding portions of such sheets.

13. The animation device of claim 12 wherein the second fold lines join the second edges of the underlying pairs of sheets.

14. A method of manufacturing an animation device for animating a series of composite images formed from sequentially unfolding pairs of images, each pair of images being associated parts of a respective composite image, the method comprising the steps of:

(a) providing an elongate continuous strip of material having an image bearing side and an opposed back side, the strip of material comprising a plurality of adjacent first and second image sections spaced along the strip;

(b) printing a plurality of pairs of images on the image bearing side of the strip of material, each pair of images printed on a respective pair of image sections and including a first image printed on a first image section and a second image printed on a second image section of the respective pair of image sections, each pair of first and second images forming a part of a respective composite image;

(c) folding the strip of material alternately forwardly and backwardly along a set of alternating forward and back fold lines, one of the sets of fold lines located between the pairs of image sections and the other set of fold lines located between the first and second image sections of each pair of image sections, positioning each pair of first and second image sections against each other with the first image section overlying the second image section and the image bearing sides of the image sections facing each other;

(d) joining a plurality of segments of an elongate flexible member to the pairs of image sections, each segment joined respectively to a portion of each first image section spaced away from the associated second image section and joined to a corresponding portion of the next adjacent first image section; and (e) joining an end of the strip of material to an upper surface of a guide sheet, the upper surface being configured to support the folded strip of material.

15. The method of claim 14 wherein the step of providing the continuous strip of material further comprises the steps of:

(f) providing a page of the material having opposite sides, the image bearing side of the strip on one side of the page and the back side of the strip on the opposite side of the page; and (g) separating the page of material into portions attached to one another to form the continuous strip of material.

16. The method of claim 14 including the steps of:

(f) locating each first image between a respective first pair of immediately adjacent fold lines and each second image section between a respective second pair of immediately adjacent fold lines, where the distance between the first pair of fold lines is greater than the distance between the second pair of fold lines so that the folded pairs of image sections form a staggered arrangement of folded pairs of image sections.

17. The method of claim 14 including the steps of:

(f) inserting a portion of the guide strip through an opening in a guide member;

(g) unfolding the first image portion of an uppermost pair of image portions; and (h) fixedly attaching the unfolded image portion to the outside of the guide member.

* * * * *